(12) United States Patent
Kanechika et al.

(10) Patent No.: US 6,577,270 B2
(45) Date of Patent: Jun. 10, 2003

(54) RADAR TRANSCEIVER

(75) Inventors: Masayuki Kanechika, Zama (JP); Fumio Kubo, Yokohama (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 09/930,648

(22) Filed: Aug. 15, 2001

(65) Prior Publication Data

US 2002/0075181 A1 Jun. 20, 2002

(30) Foreign Application Priority Data

Aug. 28, 2000 (JP) ........................... 2000-257234
Jan. 19, 2001 (JP) ........................... 2001-011735

(51) Int. Cl.$^7$ ............................................. G01S 13/34
(52) U.S. Cl. ................... 342/199; 342/118; 342/129; 342/175; 342/200
(58) Field of Search ................. 342/1–13, 27, 342/42, 59, 61, 73, 82, 89, 175, 118–146; 333/24, 25, 236–239

(56) References Cited

U.S. PATENT DOCUMENTS

| 4,122,449 A | * | 10/1978 | Endo ........................... 333/116 |
| 4,302,758 A | * | 11/1981 | Tomasi ........................ 342/109 |
| 4,675,684 A | * | 6/1987 | Spence ........................ 342/394 |
| 5,263,193 A | * | 11/1993 | Lammers et al. .......... 455/315 |
| 5,510,794 A | * | 4/1996 | Asbury et al. ................ 342/42 |
| 6,060,815 A | * | 5/2000 | Nysen ........................ 310/318 |

FOREIGN PATENT DOCUMENTS

| JP | 8-179030 | 7/1996 |
| JP | 9-243737 | 9/1997 |
| JP | 409232887 A | * 9/1997 |
| JP | 11-160423 | 6/1999 |
| JP | 11-311668 | 11/1999 |

OTHER PUBLICATIONS

Itoh, Kenji, *Foundations for microwave mixer circuits*, Mitsubishi Electric Corp., Kanagawa, Japan, MWE 1997, Microwave Workshop Digest.
*Applications Notes InP and GaAs Gunn Diode Devices*, Litton Solid State Division, Revision A, Jun., 1997, pp. 1–8.

* cited by examiner

*Primary Examiner*—Thomas H. Tarcza
*Assistant Examiner*—Isam Alsomiri
(74) *Attorney, Agent, or Firm*—Carella, Byrne, Bain, Gilfillan, Cecchi et al.; Elliot M. Olstein; William Squire

(57) ABSTRACT

A compact millimeter wave radar transceiver at low cost is provided wherein a direct current voltage applying circuit is coupled to a high frequency line to apply a fast pulse wave without losing a sharp input pulse pattern. A voltage is applied to a negative resistance diode, such as a Gunn diode, which is variably controlled to vary the diode oscillating frequency signal, which signal is outputted as a transmitting wave. The transmitted wave is reflected by a target and received by the negative resistance diode. The received wave is detected as a heterodyne detection utilizing a non-linear property of the negative resistance diode. A frequency difference between the transmitted wave and the received reflected wave is outputted via a low-pass filter and processed to detect the target. To keep the sharp pulse wave pattern for applying to the high frequency line, a Y-shaped power distributor, "Wilkinson divider", consisting of λ/4 (λ designates wave length) line elements Z1, Z2 and Z3, is between a capacitor connected to a high frequency input/output terminal and a direct current voltage input terminal to provide a leakage power suppressing effect between the latter terminals.

10 Claims, 4 Drawing Sheets

RADAR TRANSCEIVER

BACKGROUND OF THE INVENTION

1. Field of the Invention

The present invention relates to a radar transceiver particularly for cars and relates to a direct current voltage applying circuit to a high frequency line equipped in a bias applying circuit, IF (intermediate frequency) acquiring circuit or a micro-wave circuit and the like used in the radar transceivers.

2. Brief Description of the Related Art

FIG. 2 is a block diagram illustrating a constitution of a widely used radar system for cars. An antenna radiate radio beams in accordance with frequencies from an oscillator 3 arranged in a transmitter. A reflected wave from a target received by the antenna 1 is inputted to a frequency converter 5 via circulator 2, which has a function to separate the received wave and the transmitted wave. The reflected wave and a local oscillation generated by the oscillator 3 in a different frequency from the transmitted wave, are converted and outputted as an intermediate frequency (IF). The outputted IF is detected and amplified by a signal processing unit 6 for determining a position of the target, and the detected result is displayed on a displaying device D. More precise detection with less noise can be attained by converting the reflected wave into the IF. Thus a detecting method after converting the received wave into the IF, namely, a heterodyne detection is employed.

Usually millimeter waves are used in the radar systems for cars from viewpoints of a beam width, a measuring accuracy and dimensions of the radar system etc. Waves radiated from the antenna 1 arranged at the front end of the car are reflected by cars running ahead and processed for detecting positions of cars so as to avoid collisions with cars running ahead. Three widely used methods of measuring a distance to the target are shown in FIGS. 3A to 3C in the form of block diagrams.

A pulse radar system is shown in FIG. 3A. In the figure reference numeral "11" is an antenna, "12" is a transmitter, "13" is a stabilized oscillator, "14" is a range gate for measuring the distance, "15" is a synchronous detector, "16" is a pulse stretching circuit and "17" is a detector.

FIG. 3A shows the arrangement of a pulse Doppler radar system for measuring a relative velocity of the car to the target by utilizing Doppler shifts of carrier waves. This type of radar system can transmit and receive waves at different timings so as to execute a several number of detection simultaneously. However, in this system a high peaked output is required in order to attain a high detecting performance. In order to gain the detected distance with higher accuracy the heterodyne detection is required.

FIG. 3B shows a two-frequency (continuous wave) CW type radar system. In the figure reference numeral "21" is an antenna, "22" is a circulator, "23" is an oscillator, "24" is a modulator, "25" is a mixer, "26" is an amplifier, "27" is a synchronous detector, "28a" and "28b" are BPF (band pass filter) and "29" is a phase sensitive detector.

This radar system simultaneously transmits two continuous waves having close frequencies and determines the distance based on a detected phase difference between Doppler components of reflected waves, and the relative velocity of the target based on Doppler frequencies of reflected waves.

FIG. 3C shows an FM-CW type radar system. In the figure reference numerals "31a" and "31b" are antennas, "32a" and "32b" are directional couplers for a transmitting side and a receiving side respectively, "33" is an oscillator, "34" is a frequency modulator, "35" is a mixer and "36" is an amplifier.

In this type radar system a transmitting wave is modulated in frequency form so as to obtain a triangular wave and the like. The frequency modulated transmitting wave and the reflected wave are mixed so as to gain a beat frequency, from which a distance to the target and a relative velocity to the target are detected.

The above-mentioned pulse Doppler radar system, two-frequency CW radar system and FM-CW radar system are constituted by combinations of several components. Each component such as oscillator, the modulator, the mixer and the amplifier etc. is constituted by a combination of electronic parts, which differs from types of the radar systems.

Since the combinations of a considerable number of components are employed in the above-mentioned conventional radar systems, it is rather difficult to obtain compact sized radar systems. Further specifically structured wiring such as a micro strip line, an NRD (nonradiative dielectric guide) and a wave guide etc. which are employed to connect the above-mentioned components, makes it more difficult to realize compact sized radar systems and direct part mountings on these radar systems.

Since conventional radar systems require a considerable number of parts, it is inevitable that the radar systems require high manufacturing costs, which are difficult to be reduced.

Since constitutions of the radar systems are different in different respective types of radar systems, even a component having similar function can not be employed in different radar systems.

In addition, a diredt current voltage applying circuit employed in a high frequency voltage line of the pulse Doppler radar has the following problems.

FIG. 5 is a generally used circuit diagram for applying a direct current voltage to the high frequency voltage line. In the figure, character "A'" is a high frequency input terminal, character "B'" is a direct current voltage input terminal and character "C'" is an output terminal for outputting a resultant voltage when the direct current voltage is applied to the high frequency line. Reference characters "C1'", "C2'" and "L1'" are respectively capacitors (C') and a choke coil (L).

The circuit shown in FIG. 5 employs a direct current supplying coupled circuit, where the direct current voltage is applied to the high frequency line via the choke coil L1. Since an impedance value of the choke coil L1 on the high frequency side is high, the direct current voltage can be applied to the circuit without a high frequency leakage from the terminal B and without any influences on frequency properties of the high frequency line.

However, in such conventional direct current voltage applying circuit where the choke coil is employed, there is a problem that a voltage with high frequency pulse can not be applied. In such circuit a transient phenomenon caused by the choke coil and the capacitor arranged at the direct current input terminal side, deforms pulse wave pattern as shown in FIG. 6B.

FIG. 6A shows a high pulse wave pattern P at the direct current input terminal side B where a pulse height is 5.5−5.0=0.5V and a pulse width 36 ns (which includes 2 ns in the rise and fall duration respectively).

FIG. 6B shows a prior art pulse wave pattern P' at the output terminal C in a deformed state.

SUMMARY OF THE INVENTION

The present invention is carried out in view of the above-mentioned problems. One of the objectives of the present invention is to provide a simply constituted radar transceiver capable of being applicable to various types of radar systems, capable of making more compact system and capable of reducing its manufacturing costs without combining a considerable number of components.

And other objective of the present invention is to provide a direct current voltage applying circuit to a high frequency line where a pulse voltage pattern is kept in the same form as before application.

The radar transceiver according to the present invention comprises a negative resistance diode capable of varying oscillating frequencies according to applied voltages, where the negative resistance diode transmits a pulse wave and receives a reflected pulse wave by a target. The received reflected pulse wave is processed with a heterodyne detector so that the target is detected.

The oscillation from the negative resistance diode is modulated by variably controlling the voltage to be applied to the negative resistance diode.

The oscillation, the frequency modulation and the frequency conversion performed by respective components in conventional radar systems are replaced by one component, namely, the negative resistance diode. The negative resistance diode also can eliminate the circulator for separating the transmitted and received waves. Consequently a more compact radar system with less manufacturing cost is realized.

The direct current applying circuit to the high frequency line used in radar systems comprises a line element having a leakage power suppressing effect which is connected to the direct voltage input terminal.

An input terminal of the line element comprising a power distributor is connected to a high frequency wave input terminal and an output terminal of the power distributor is connected to a direct current voltage input terminal so as to attain the leakage power suppressing effect.

The above-mentioned power distributor is arranged as a Y-shaped power distributor in a distributed parameter circuit.

BRIEF DESCRIPTION OF DRAWINGS

FIG. 7 is a diagram schematically showing a wave pattern during operation of the radar system according to the present invention.

DETAILED DESCRIPTION OF THE PREFERRED EMBODIMENTS

Figure 1A:
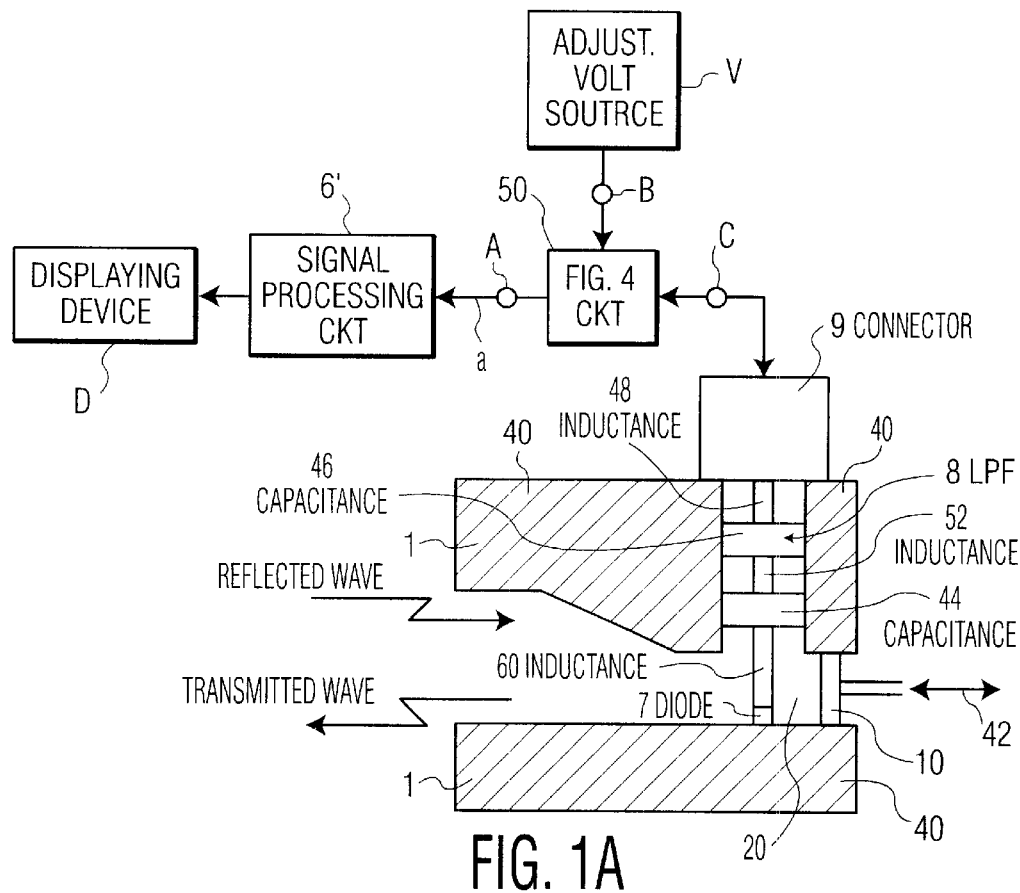
FIG. 1A shows a diagrammatic arrangement of the main portion of the present invention.

Hereinafter preferred embodiments according to the present invention are explained in detail by referring to the drawings.

Figure 1B:
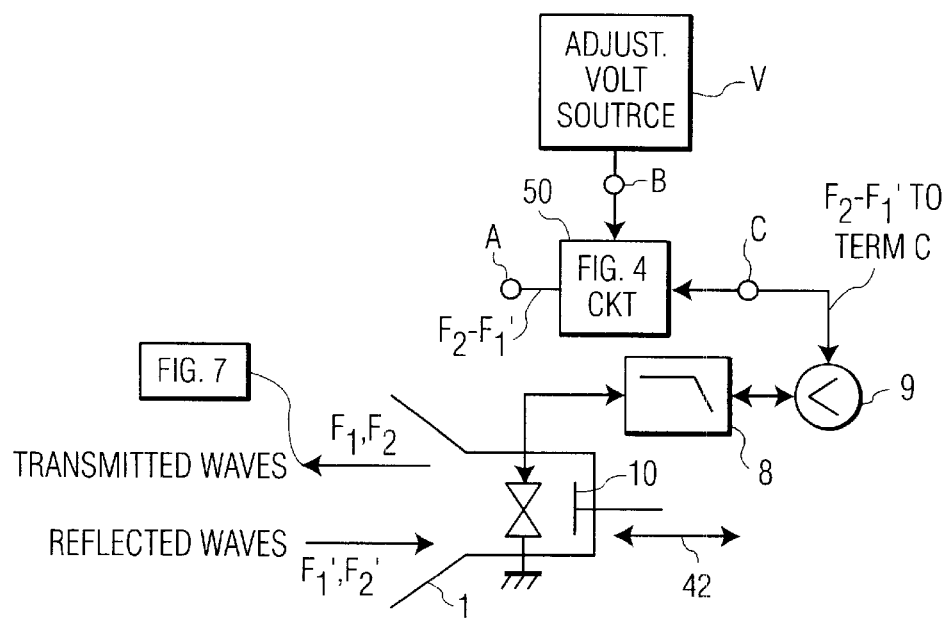
FIG. 1B is a circuit diagram of FIG. 1A.

FIG. 1A shows a diagrammatic arrangement of the main portion of the present invention and. FIG. 1B shows a circuit diagram of the arrangement. In these figures, negative resistance diode 7, such as a Gunn diode, has an oscillating function, a frequency modulating function and a frequency conversion function. The negative resistance diode 7 varies an oscillating frequency in accordance with an applied voltage so that the oscillating frequency modulation (FM) is executed by variably controlling the applied voltage. The negative resistance diode 7 also has a frequency conversion function for converting the received frequency together with the local oscillating frequency oscillated from itself and outputting as an intermediate frequency (IF). In FIG. 1A, an adjustable DC voltage source V applies the DC voltage V to terminal B of circuit 50 (FIG. 4) for modulating the frequency as explained below. The circuit 50 has a high frequency output signal terminal A, direct current input terminal B, and a direct current and high frequency input/output terminal C. Terminal C is coupled to the input/output port of connector 9. Terminal A is connected to signal processing circuit 6' corresponding to the prior art circuit 6 of FIG. 2, for example. Of course, the circuit 6' may be modified from circuit 6 as known by one of ordinary skill to process the signals on terminal A. Negative resistance diode 7, FIG. 1B, is connected between ground on one side and on the other side to the connector 9 through a low pass filter (LPF) 8. The housing 40 has portion that forms an antenna 1. The antenna 1 receives the waves reflected from a target and directs these waves to the diode 7. The antenna 1 also transmits waves generated by the diode 7. In cavity 20, FIG. 1A, is a low pass filter 8 formed by capacitances 44 and 46 and inductances 48, 52 and 60. Diode 7 is connected to inductance 60. The LPF comprises inductances 48, 52 and 60 connected in series between the connector 9 and the diode 7. Capacitance 46 is connected to the junction of inductance 48, 52 and ground and capacitance 44 is connected to the junction of inductances 52, 60 and ground.

One negative resistance diode 7 attains the functions of three different components for the oscillation, the frequency modulation and the frequency conversion employed in the conventional radar systems and, in addition, eliminates the need for the circulator. In other words, the oscillator 3, the frequency modulator in the frequency modulating circuit 4, the frequency converter 5 and the circulator 2 in FIG. 2 employed in the conventional radar system is replaced by one negative The low-pass filter (LPF) 8 functions to output intermediate frequency signals efficiently.

Connector 9 connects a high frequency line at terminal A to an adjustable direct current voltage supplying circuit V. The connector 9 has functions for inputting the voltage at terminal C from the voltage supplying circuit V, the bias circuit 50 to the diode 7 via connector 9 such that the transmitting frequency is switched between a first frequency and a second frequency and vice versa and for outputting the intermediate frequency IF acquired by the negative resistance diode 7 through the LPF 8 in response to the received reflected waves.

A sliding wall 10 is adjacent to the diode 7 to adjust the oscillating frequency of the diode 7 output signal. In FIG. 1A, wall 10 adjusts the wave reflection characteristics of cavity 20 formed by housing 40. The wall 10 is displaced in directions 42 to finely adjust the manner of reflection of waves that are emitted from the resistance diode 7 to the wall 10. The displacement of the wall 10 finely adjusts irregularities of the negative diode 7 generated waves. The wall 10 (manifesting an adjustable impedance) finely adjusts the oscillating frequency of the negative resistance diode 7 by sliding movements within the housing 40 as shown in FIG. 1A.

Figure 2:
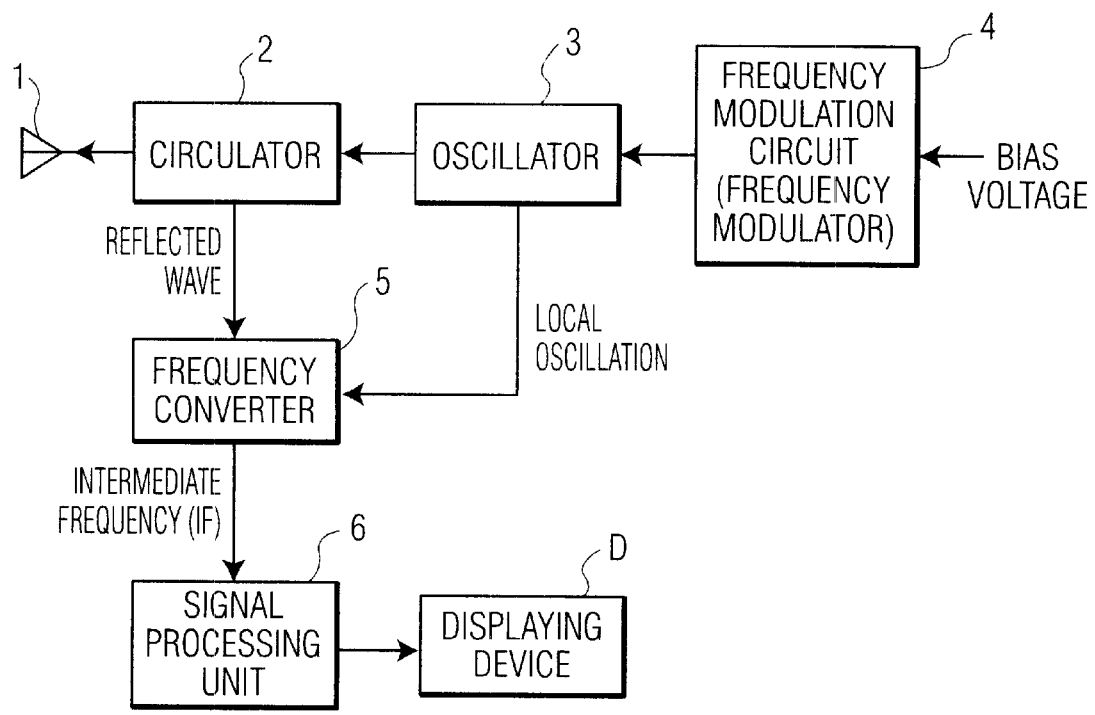
FIG. 2 is a block diagram illustrating an arrangement of generally used radar systems.
Figure 3A:
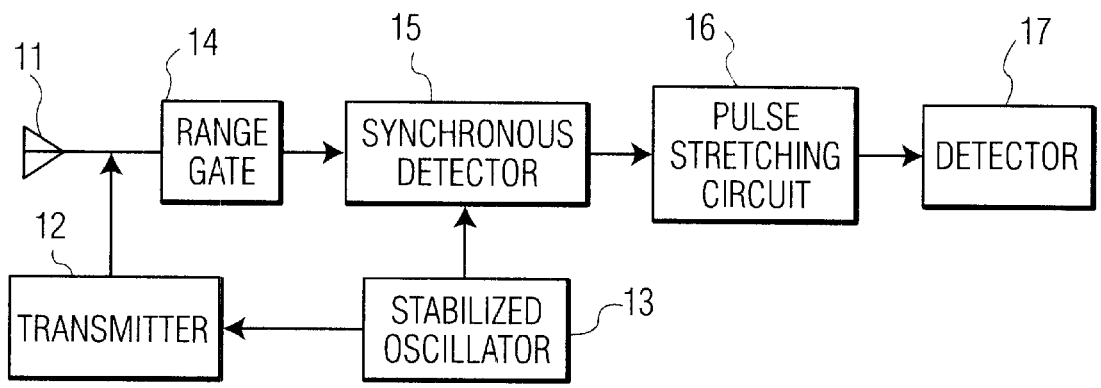
FIG. 3A to FIG. 3C are block diagrams illustrating conventional radar systems for cars.
Figure 3B:
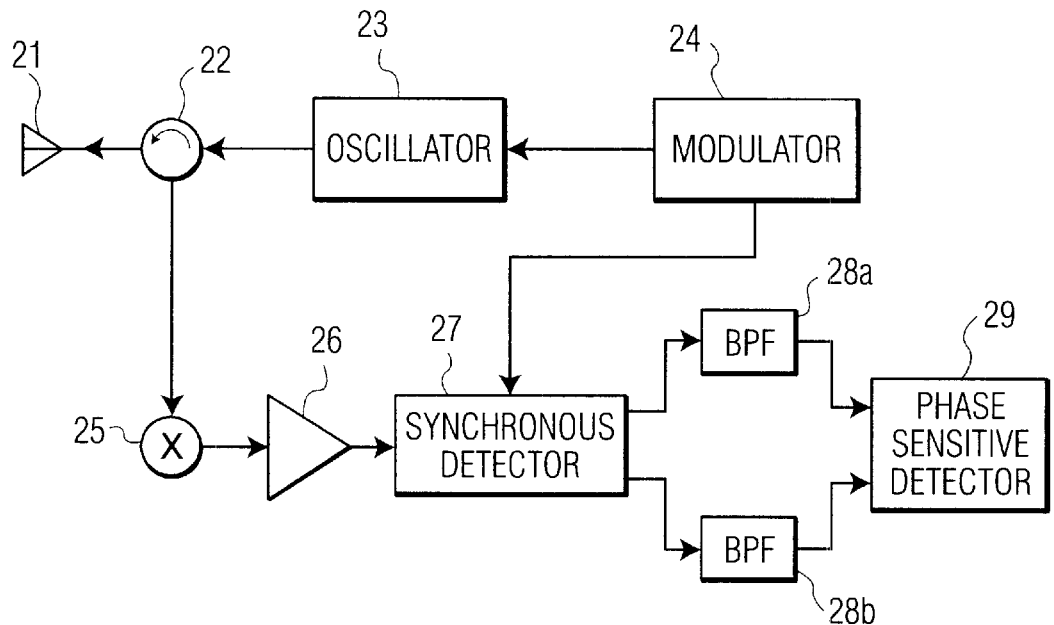
Figure 3C:
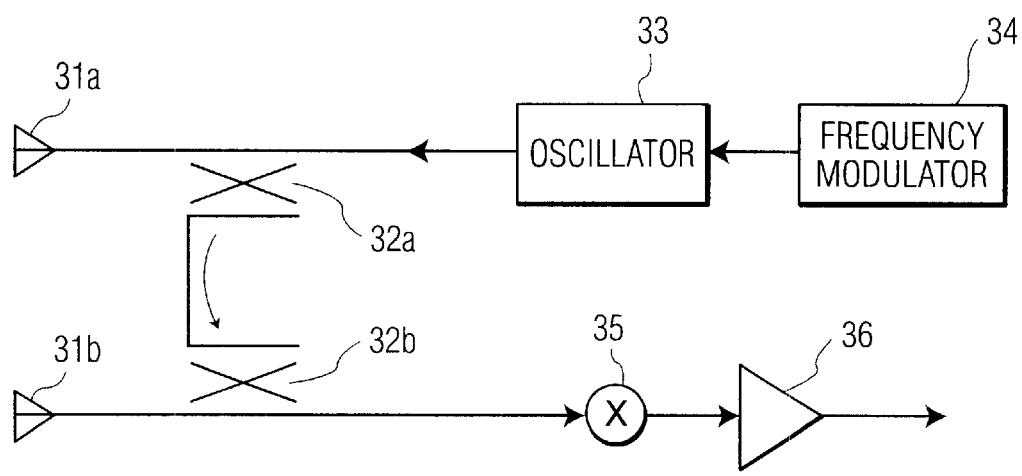

A signal processing circuit 6' and displaying device D similar to those shown in FIG. 2 are arranged in the radar transceiver of the present invention as shown in FIG. 1A, as an effective radar system for cars. The radar transceiver according to the present invention also may be used as a sensor for AFS (Adaptive Front-lighting System) or a sensor for a front-end of a wireless communicating device.

In the present embodiment the voltage is variably applied to the negative resistance diode 7 so as to vary the oscillating frequency, which is outputted as the transmitted wave. The reflected wave by the target is received by the above-mentioned negative resistance diode 7 and detected in the form of the above-mentioned heterodyne detection by utilizing a non-linear property of the negative resistance diode. Thus, targets such as cars running ahead etc. are detected (their positions are detected).

In other words, the wave oscillated and outputted from the negative resistance diode 7 is reflected by the target and inputted to the negative resistance diode 7. The inputted wave is detected as the heterodyne detection by the non-linear performance of the negative resistance diode 7, as a result two frequencies are obtained: the sum of the received frequency and oscillating frequency (transmitted frequency), and the difference between the two frequencies. The frequency difference is outputted from the connector 9 for supplying the bias voltage and for outputting the IF, via the low-pass filter 8.

Since the frequency difference (a beat frequency) obtained from the connector 9 may be processed according to a predetermined signal processing procedure so as to detect the target, it functions as a radar system.

FIG. 7 schematically shows the wave pattern and its frequency during operation of a radar system according to the present invention. A first DC voltage V1 is applied for a time T1 period such that a first millimeter wave F1 with a first frequency (GHz) is radiated from the negative resistance diode 7. After the time T1 period passes, a second millimeter wave with second frequency F2 (GHz) is radiated from the negative resistance diode 7 for a time T2 period. After the time T2 period passes, the second millimeter wave is switched to the first millimeter wave. Switching of frequency is repeatedly performed in the same manner as described above. The first and second millimeter waves are reflected by a target when they are incident on it. The first frequency which is reflected by the target returns to the negative resistance diode 7, and is detected as a reflected first frequency (F1'). At this time, a sum of frequencies [F2+F1' (GHz)] and a difference of frequencies [F2−F1' (MHz)] are generated. The low pass filter 8 passes therethrough the difference of frequencies and prevents the sum of frequencies from passing therethrough. The difference of frequencies signal is transmitted to the connector 9, and further to the signal processing circuit. Since the magnitude of the difference of frequencies is in MHz, the frequency converter 5 is unnecessary. Further, since the difference between the second frequency F2 and the reflected first frequency F1 (beat frequency) is used, components such as the circulator 2, 22, and mixer 25, 35 are also unnecessary. After the reflected first frequency F1' is detected, a reflected second frequency F2' of the second millimeter wave is detected. However, neither the sum of frequencies (F1+F2') nor the difference of frequencies (F1−F2') regarding the reflected second frequency F2' is processed.

As described above, since the negative resistance diode 7 modulates oscillated frequency from itself by varying the applying voltage to the negative resistance diode 7, virtually the negative resistance diode 7 can have two functions of the oscillator and the modulator. Consequently the FM pulse radar system and FM-CW radar system are realized by one component without arranging respective modulators for the two radar systems.

Therefore the radar system according to the present invention does not require combining a considerable number of components as required in conventional millimeter wave radar systems. One negative resistance diode functions as the oscillator, the frequency modulator and the frequency converter, which used to be attained by three different components in the conventional radar system. In addition, the circulator used in the conventional system can be eliminated when the negative resistance diode is employed. Consequently, a more compact radar system with lower manufacturing costs is realized and the arrangement according to the present invention may be applicable to several types of radar systems.

Hereinafter a direct current voltage applying circuit to a high frequency line, one of the components equipped in the above described radar transceiver, is explained.

Figure 4:
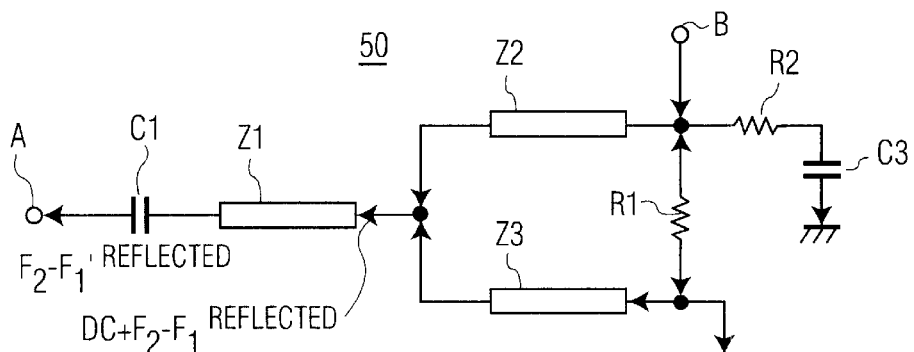
FIG. 4 is a diagram of a direct current voltage applying circuit to a high frequency line employed in the radar system of the present invention.

FIG. 4 shows a biasing circuit for the arrangement of an embodiment of the direct current voltage applying circuit to the high frequency line according to the present invention. In the figure, characters "A", "B" and "C" respectively represent a high IF frequency output terminal, a direct current voltage input (applying) terminal and a direct current voltage output terminal which also functions as a high intermediate frequency IF input/output terminal. A composite voltage, consisting of the high intermediate (IF) frequency signal (F2−F1') inputted to the terminal A and the applied direct current voltage to the terminal B, is outputted at the terminal C, which is connected to the connector 9 of the above-mentioned radar transceiver (see FIGS. 1A and 1B). The capacitor C1 subtracts the applied DC voltage such that only the AC element of the IF signal remains at terminal A and is applied to the circuit 6', FIG. 1. DC voltage supplying terminal B is further connected to a voltage adjusting circuit, FIG. 1, for modulating the frequency. The high IF frequency [input/]output terminal A is connected to a frequency signal processing circuit 6', FIG. 1A (not shown in FIG. 4).

FIG. 4, power distributor 50 is arranged between a capacitor C1 at the high frequency input/output terminal A and the direct current voltage input terminal B. The power distributor 50 comprises λ/4 (λ represents wave length) line elements Z1, Z2 and Z3 so as to provide a suppression effect against a leakage power at the output side. Impedance values of the line elements Z1, Z2 and Z3 are respectively 42Ω, 59Ω and 4Ω. DC impedance of the line elements Z1, Z2, and Z3 can be considered as substantially zero. A resistor R1, which has a resistance value of 100Ω, is connected to and between one end of the line elements Z2 and Z3, which elements are connected at their other ends to line element Z1. Resistor R1 is connected to and between direct current voltage input terminal B and terminal C. Line element Z2 is connected to and between the junction of terminal B and resistors R1 and R2 at one end and to line Z1 at its other end. Line element Z1 is connected at one end to the junction of one end of line elements Z2 and Z3 and at its other end to terminal A through capacitor C1. Resistor R2 has a value of 50Ω. Capacitor C3 is connected to and between resistor R2 and system ground. The capacitor C3 may be replaced by an open stub having a value of λ/4. Line element Z3 is connected to and between element Z2 and the junction of terminal C and resistor R1.

Figure 5:
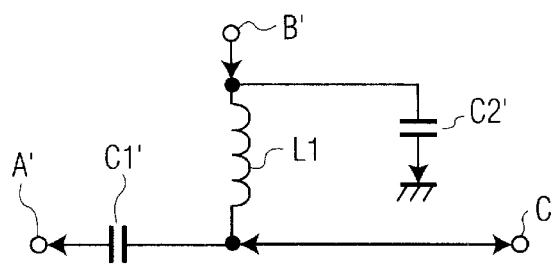
FIG. 5 is a diagram of a conventional direct current voltage applying circuit to a high frequency line.

The above described circuit 50 employs a "Wilkinson divider" (Y-shaped power distributor) constituted by microstrip lines (a distributed parameter circuit) and so on, so that the direct current voltage may be applied without the choke coil (L1 in FIG. 5) employed in the conventional circuit.

Since calculated leakage power suppression effects are over 50 dB (less than $\frac{1}{10^5}$ of the power) at the center frequency and 25 dB (less than $\frac{1}{10^{2.5}}$ of the power) in 20% of the bandwidth, the high frequency power, which is inputted to the terminal C, exhibits negligible leaks from the terminal B. The power loss between the terminal A and the terminal B is 3 dB (relative to the power) in the above-mentioned Wilkinson divider, which is insignificant from a practical point of view.

The circuit shown in FIG. 4 is connected to the connector 9 shown in FIGS. 1A and 1B via the high frequency input/output terminal C. Switching from the first frequency F1 to the second frequency F2 and vice versa is performed by switching voltages V1 and V2 supplied from the DC voltage input terminal B shown in FIG. 4. The reflected first frequency F1' is reflected by the target and returned to the negative resistance diode 7. The negative resistance diode 7 detects the reflected first frequency F1', and the sum of frequencies (F2+F1') and the difference of frequencies (F2−F1') are inputted to the low pass filter 8. Only the relatively low frequency component (F2−F1') is passed through the low pass filter 8 to the terminal C. The relatively low frequency component, i.e., an intermediate frequency is then transmitted to the terminal A, thereby the subtracted frequency is detected.

Figure 6A:
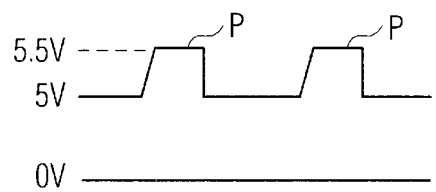
FIG. 6A shows a prior art direct current voltage pulse wave to be applied to a conventional high frequency line.
Figure 6B:
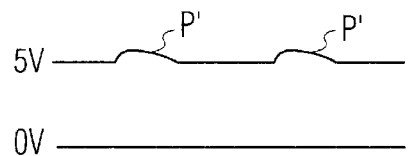
FIG. 6B shows a prior art gained direct current voltage pulse from the conventional high frequency line.

The above-mentioned applied voltage to the terminal B, which varies in a fast pulse wave pattern, is outputted from the terminal C keeping its pulse wave pattern as shown in FIG. 6A without showing any deformed wave pattern as in the conventional circuit (see FIG. 6B).

In the conventional circuit since the applied voltage as the fast pulse wave pattern is deformed due to the transition phenomenon, it is not suitable to use as the applying voltage. On the other hand the present embodiment enables the voltage to be applied to the high frequency line to keep its pulse wave pattern as it is.

The present embodiment can be employed not only in the bias voltage applying circuit and the intermediate frequency output circuit of the pulse radar transceiver, but also in microwave circuits and the like where applications of the direct current voltage to the high frequency line are required.

As explained above, since the radar transceiver according to the present invention has the effect that the radar transceiver does not require to combine a considerable number of components, it is formed more compact at lower cost than the conventional radar system.

The other effect is that the constitution of the present invention also is applicable to a plurality of types of radar systems.

The present invention also is capable of keeping the voltage to be applied to the high frequency line its pulse wave pattern as it is.

What is claimed is:

1. A method for detecting a target by a heterodyne detection using a negative resistance diode comprising steps of:

transmitting a first wave having a first frequency and a second wave having a second frequency from said negative resistance diode while repeatedly switching from said first frequency to said second frequency at a predetermined time interval and vice versa;

producing a signal manifesting a difference of frequencies between said first frequency wave reflected from a target and returned to said negative resistance diode, and said second frequency transmitted from said diode; and outputting said difference of frequencies signal as an intermediate frequency for signal processing.

2. The method for detecting the target according to claim 1, wherein said negative resistance diode is a Gunn diode.

3. The method for detecting the target according to claim 1 including the step of driving said negative resistance diode with a DC voltage for switching said first wave and said second wave transmitted from said negative resistance diode at a rate in accordance with the value of a DC voltage supplied to said negative resistance diode.

4. A radar transceiver for detecting a target by a heterodyne detection including a high frequency line, said high frequency line comprising:

a negative resistance diode for transmitting a first wave having a first frequency and a second wave having a second frequency and including means for switching at a predetermined time interval from the first wave frequency to the second wave frequency and vice versa in accordance with a DC voltage applied to the negative resistance diode; and a terminal for receiving the DC voltage applied to the negative resistance diode;

wherein said negative resistance diode includes means to produce an intermediate frequency signal manifesting the difference of frequencies between the first wave incident on and reflected from a target and returned to said negative resistance diode by said target via said transceiver, and said transmitted second wave.

5. The radar transceiver according to claim 4 wherein said negative resistance diode is a Gunn diode.

6. The radar transceiver according to claim 4 including a filter coupled to the diode for selectively passing a wave at a predetermined frequency.

7. The radar transceiver according to claim 4 wherein said diode exhibits a signal at an oscillating frequency, said transceiver including an adjustable impedance for adjustably setting the value of the oscillating frequency of said negative resistance diode in accordance with the value of said impedance by moving a sliding short.

8. The radar transceiver according to claim 4 including a DC voltage supply circuit having leakage power suppressing effect, further including circuit means for coupling said diode to said DC voltage supply circuit.

9. The radar transceiver according to claim 4 including a power distributor coupled to the diode, the distributor exhibiting a leakage power suppressing effect and comprising at least one line element for receiving an applied DC voltage.

10. The radar transceiver according to claim 9 wherein said power distributor is a Y-shaped power distributor in a distributed parameter circuit.

* * * * *